July 24, 1962 R. P. CASE 3,046,416

PHASED PULSE GENERATOR

Filed Nov. 20, 1958 3 Sheets-Sheet 1

INVENTOR
RICHARD P. CASE

BY [signature]

AGENT

United States Patent Office 3,046,416

Patented July 24, 1962

3,046,416

PHASED PULSE GENERATOR

Richard P. Case, Endicott, N.Y., assignor to International Business Machines Corporation, New York, N.Y., a corporation of New York Filed Nov. 20, 1958, Ser. No. 775,310
4 Claims. (Cl. 307—88.5)

Figure 1:
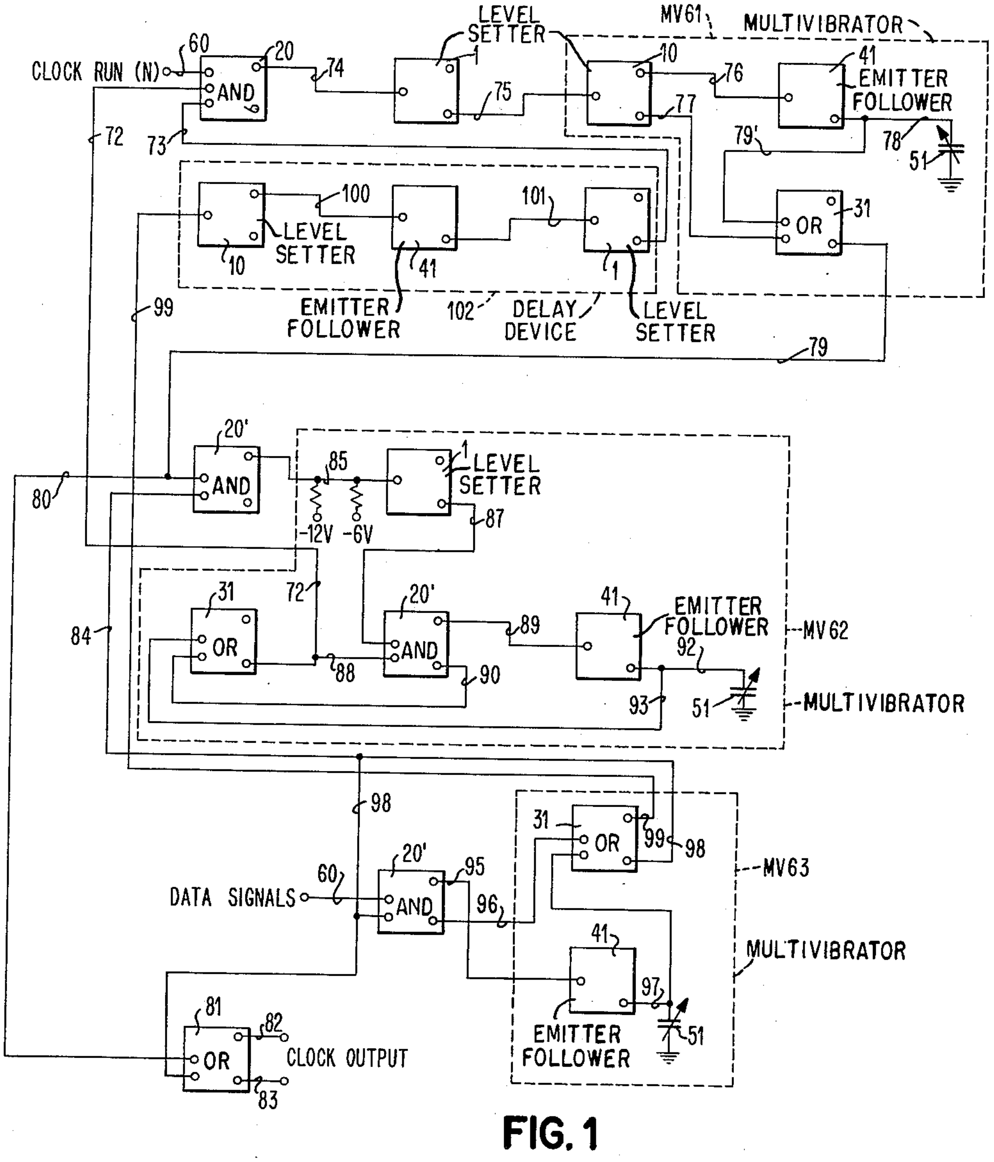

The invention concerns a pulse generator commonly referred to as a "clock." More specifically, the pulse generator is adapted to provide output pulses which are phased in accordance with variations in applied data input signals.

The main object of the present invention resides in the provision of a phase clock which is simple in design and requires less hardware than the prior art devices.

Another object of the present invention provides a clock system that, by virtue of the unique arrangement of its components and with the simplicity in design, enables the use of standard components in which wide variations in component characteristics may be tolerated.

Other advantages of the present invention permit wider variations in the input signals and the elimination of cumbersome delay means required in the prior art devices.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 is an electrical circuit diagram showing the principal components in block form.

Figure 2A:
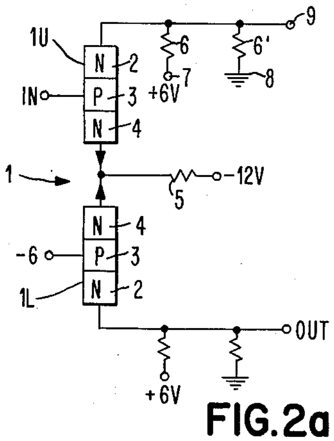
Figure 2B:
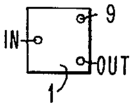

FIGS. 2*a* and 2*b* show a transistorized configuration of a "P"-type signal lever setter and the circuit block configuration therefor.

Figures 3A, 3B:
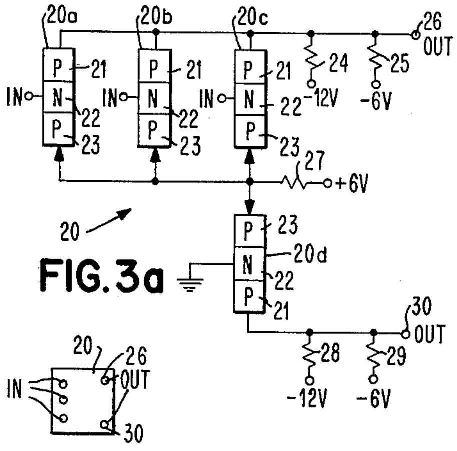

FIGS. 3*a* and 3*b* show a transistorized 3-input AND device and the circuit block configuration therefor.

Figure 4A:
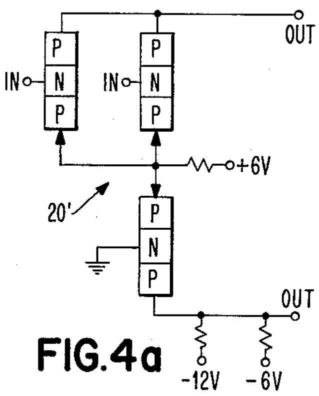
Figure 4B:
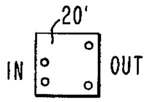

FIGS. 4*a* and 4*b* show a transistorized 2-input AND device and the circuit block configuration therefor.

Figure 5A:
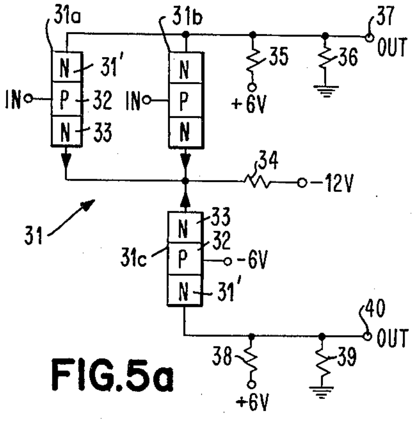
Figure 5B:
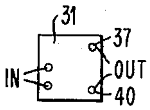

FIGS. 5*a* and 5*b* show a transistorized OR device and the circuit block configuration therefor.

Figure 6:
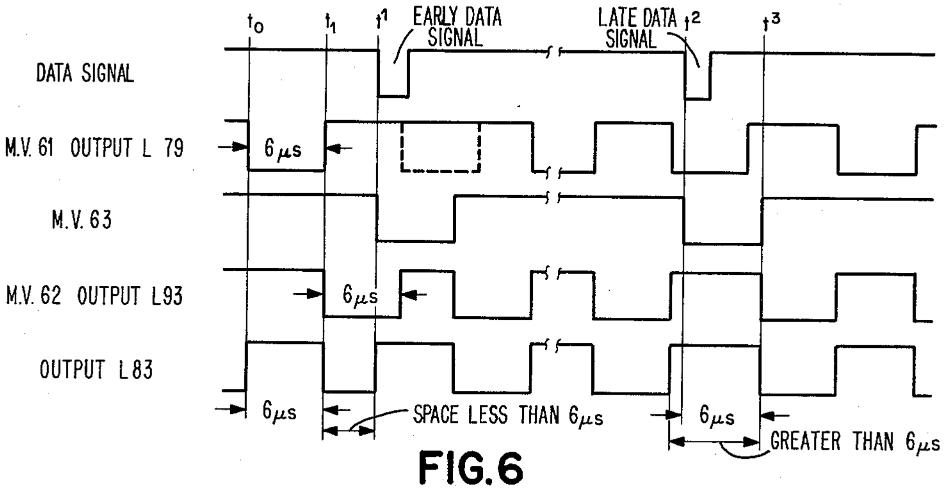

FIG. 6 is a time chart of the clock showing the relationships of the output signals to the input signals.

Figure 7A:
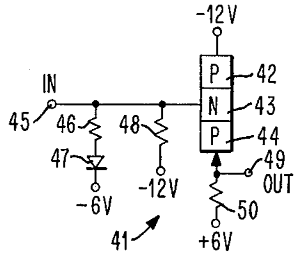
Figure 7B:
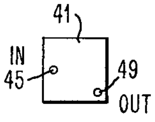

FIGS. 7*a* and 7*b* show a transistorized component, which forms part of a single-shot vibrator, and the block configuration therefor.

Figure 8A:
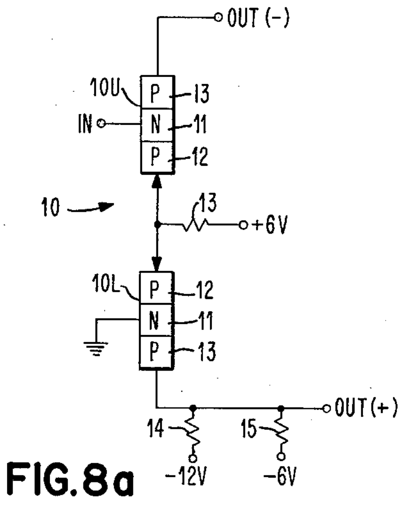
Figure 8B:
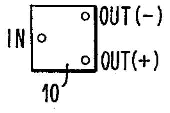

FIGS. 8*a* and 8*b* show a transistorized configuration of an "N"-type signal level setter and the circuit block configuration therefor.

Figure 9:
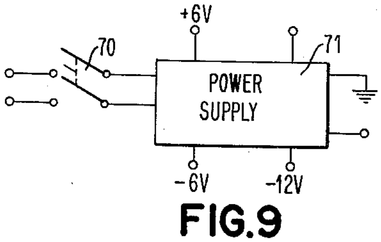

FIG. 9 shows the power supply in diagrammatic form.

As a preliminary to an explanation of the invention, it may be desirable at this point to explain the transistorized configurations of the various components used throughout the circuit diagram of FIG. 1. These components include signal level setters of the PNP type and NPN type, AND devices, OR devices, single-shot vibrators, and components thereof.

Referring to FIG. 2, there is shown a signal level setter 1 constituted primarily of NPN-type transistors 1U and 1L. Each transistor includes a collector 2, a P-type base 3 and an emitter 4. The emitters of both transistors are connected to a −12 volt supply by way of resistor 5. The collector 2 of the transistor 1U is conencted to an output line in turn connected to a +6 volt supply 7 and a ground 8 by way of resistors 6 and 6′ and an output terminal 9. The collector 2 of the transistor 1L is connected to an output line which in turn is connected to a +6 volt supply, a ground supply and an output terminal OUT. Input signals to this level setter are applied to an input terminal IN.

FIG. 8 is also a signal level setter; however, it uses PNP-type transistors referenced here as 10U and 10L. Each has an N-type base 11. Signal inputs are applied to an input terminal IN of the transistor 10U. The base 11 of transistor 10L is wired to ground. Emitters 12 of each transistor are connected to a common line in turn connected to a +6 volt supply by way of a resistor 13. Collector 13 of transistor 10U supplies an output to a terminal OUT (−). This negative output is used to indicate a signal that is out of phase with the input signal. Collector 13 of the transistor 10L is connected to an output line in turn connected to a −12 volt supply and a −6 volt supply by way of resistors 14 and 15, respectively, and an output terminal OUT (+) which issues an output signal in phase with the input signal.

The AND devices are shown in FIGS. 3 and 4. In FIG. 3, the AND device is generally referenced as 20 and consists of PNP-type transistors, respectively, 20*a*, 20*b*, 20*c* and 20*d*. The collectors, bases, and emitters are referenced, respectively, as 21, 22 and 23. The collectors 21 of transistors 20*a*, 20*b* and 20*c* are connected to an output line in turn connected to a −12 volt supply and a −6 volt supply by way of resistors 24 and 25, respectively, and an output terminal 26. Controlling signals and gate signals are applied to three input terminals referenced IN, each in turn connected to their respective bases 22. Emitters 23 are connected to a +6 volt supply by way of a resistor 27. The collector 21 of transistor 20*d* is connected to an output line in turn connected to a −12 volt supply and a −6 volt supply by way of resistors 28 and 29 and an output terminal 30.

The AND device 20′, in FIG. 4, is similar to the one just described; the only difference being that the device of FIG. 4 has one less input than the device of FIG. 3. In operation, the output terminal 26 is positive only when one or more of the input signals applied to the inputs are more negative than ground. The output terminal 30 is positive only when all input signals are more positive than ground.

The OR circuit, shown in FIG. 5, has a configuration generally referenced as 31 comprising NPN-type transistors 31*a*, 31*b* and 31*c*. Each transistor has a collector 31, a base 32 and an emitter 33. The emitters are connected to a voltage supply by way of resistor 34. The collectors of transistors 31*a* and 31*b* are connected to a +6 volt supply and ground by way of resistors 35 and 36 to an output terminal 37. The collector of transistor 31*c* is connected to an output line in turn connected to a +6 volt supply and ground by way of resistors 38 and 39, respectively, and to output terminal 40. Input signals to this device are applied to the input terminals IN.

In operation, the output terminal 37 is positive only when none of the input signals are more positive than −6 volts. The output terminal 40 is positive only when one or more of the input signals are more positive than −6 volts.

The emitter follower, generally referenced as 41, is shown in FIG. 7 and comprises a PNP-type transistor having a collector 42, an N-type base 43, and an emitter 44. The collector 42 is connected to a −12 volt source. The base 43 is connected to an input line in turn connected to an input terminal 45, a −6 volt supply by way of a resistor 46 and a diode 47, and a −12 volt supply by way of a resistor 48. The emitter 44 is connected to an output terminal 49 and a +6 volt supply by way of resistor 50. The emitter follower not only has the function of an emitter follower but, with a suitable capacity at the output, also serves as a delay device.

The clock circuit, as seen in FIG. 1, is comprised essentially of three single-shot vibrators MV61, MV62 and MV63, and devices 20 and 20′, level setters 1 and 10, OR devices 31 and emitter followers 41. The clock operates as a free-running pulse generator when it is under control of the single-shot vibrators MV61 and MV62. To operate the clock as such, it is necessary to activate the AND device 20, shown in the upper lefthand corner of the drawing. This is achieved by having a coincidence of positive gate signals (enabling signals) on the three inputs to this AND device 20. Two of these gate signals are derived from the clock itself, while the third signal is derived from an external signal identified as a Clock Run signal 59. Thus, when the latter signal is applied, the clock is set into operation and behaves as a free-running clock which issues equal output signals occurring at fixed time intervals. The particular clock in question has a 12-microsecond time cycle in which the pulse duration and space interval are each of six microseconds duration. Under this free-running condition, the clock, therefore, has a fixed frequency of operation and each output cycle occurs at a nominal fixed time interval.

In general, in the operation of a multivibrator, the latter, when off, provides a positive output which may be referred to as an enabling output. When the multivibrator is turned on, the output immediately shifts to a negative level and assumes this level for the time period of the multivibrator. At the expiration of the time period, the output shifts to its positive level. During this negative level, the output may be characterized as a disabling output.

In one of its more important aspects, the clock is adapted to issue phased output signals when it is operated under control of single-shot vibrators MV61 and MV63. During this aspect of its operations, the clock is controlled by data signals applied to an input line 60. These data signals, under certain condition, may be issued and applied to the clock on time with respect to the nominal fixed time of the free-running clock. However, there may be occasions when the applied data signals may either be early or late with respect to the nominal fixed time of the clock. In each such occasion, the clock output must be phased with these incoming data signals. When the incoming data signal is early with respect to the nominal fixed time of the clock, the output of the clock, in response to this early signal, is advanced accordingly and extends into the last occurring space interval of the clock cycle to thus lessen the time of this space interval. When the data signal is late with respect to the nominal fixed time of the clock, the clock output occurs at the nominal time; however, the pulse duration is extended accordingly and, at the termination of the pulse output, the clock cycle is rephased to begin a new nominal fixed time. This new time establishes the nominal time of the clock for subsequent free-running operations thereof until it is again rephased by the next applied data signal which may be late with respect to the last established nominal fixed time of the clock.

Referring to FIG. 1, the free-running operations of the clock provide output pulses at a fixed frequency under control of multivibrators MV61 and MV62. The operation is initiated first by supplying the clock with the proper supply voltages, this being achieved by turning on main switch 70 to a voltage supply 71. The clock is then set into operation upon application of the Clock Run gate signal 59 to the AND device 20. The two remaining inputs to this AND device are positive by virtue of enabling signals, or more precisely positive gate signals, being applied to connecting lines 72 and 73. In consequence, the AND device 20 issues a negative signal on the output thereof along line 74, which signal then passes through the level setter 1, through line 75, and then applied to the multivibrator MV61 consisting of the level setter 10, the emitter follower 41 and capacitor means 51. The negative signal on the line 75 passes through the level setter 10 and emerges as a positive signal on a line 76 and a negative signal on a line 77. The positive signal on the line 76 is applied, by way of emitter follower 41 and line 78, to charge capacitor 51. At the same time, and along line 77, the negative signal passes through OR device 31 and emerges therefrom and passes through lines 79 and 80, OR device 81, to an output line 83. After a 6-microsecond interval of time, the capacitor 51, of multivibrator MV61, becomes fully charged and thus provides a positive signal on line 79′ through the OR device 31, through the lines 79 and 80, the OR circuit 81 and the output lines 82 and 83; the latter line 83 follows the signal levels applied to the line 80. These signal outputs are fully indicated in FIG. 6 between time $t_0$ and $t_1$ on the line referenced MV61 Output L79. During this interval $t_0$–$t_1$, the MV62, which may be termed the "space multivibrator," is prevented from being turned on by virtue of the negative control imposed upon the AND device 20′ by way of line 79. The conditions existing on the inputs to this AND device 20′ at this time are such that line 79 is down while line 84 is up. As a consequence, the output from the AND device 20′ is positive and is fed along line 85 through the level setter 1 and line 87 to the AND device 20′ whose lower input, connected to line 88, is positive at this time. The upper output, connected to line 89, issues a negative signal while, at the same time, the lower output issues a positive signal on line 90. The negative signal on line 89 passes through the emitter follower 41, through line 92, to the capacitor 51 of MV62. This negative signal acts to discharge the capacitor 51. The positive signal on the line 90 passes through the OR device 31 and on to the line 72 in turn connected to one of the three inputs of the AND device 20. At time $t_1$, however, the output of the MV61 appears as a positive-going signal on the line 79, which signal passes through the AND device 20′ and appears as a negative signal on lines 85 and 87 and as a positive signal on line 89; the latter signal initiating the charging of the capacitor 51, by way of line 92, for the next 6-microsecond interval of time. At the beginning of this second time interval, lines 92 and 93 are negative to provide a negative gate signal through the OR device 31 and line 72 to the AND device 20; thus rendering the latter effective to prevent the turning on of the MV61. The charging of the capacitor 51 in the MV62 takes place during the second time interval following which a positive-going shift will appear on the lines 92 and 93. The effect of this positive-going shift causes line 72 to go positive and thus enables the MV61 to turn on again to provide a second output signal on output lines 79, 80 and 83. In this manner, the MV61 and the MV62 alternate in operation to provide 12-microsecond cycle outputs, each of which having a signal of six microseconds and a space of six microseconds. This operation continues as long as the clock is in free-running status, in which MV61 and MV62 are operable while MV63 is inactive.

In the operation, during which data signals are applied to the input line 60, the clock outputs are phased according to variations in the input signal with respect to the nominal time fixed by the free-running operations of the clock. When an applied data signal is early, relative to the current nominal fixed time, MV63 will be set into operation and will be operative for six microseconds. The output from MV63 will be issued before termination of the normal 6-microsecond space interval to thereby decrease the space interval to the extent that the MV63 is operated in advance of the normal fixed time of the clock. At the expiration of the 6-microsecond interval of the MV63, the MV62 will be set into operation to thus provide a new phased time of operation. Following the expiration of the MV62 Output interval, and in the absence of a data signal, the clock returns to free-running operations.

In an operation where the data signal is late with respect to the nominal fixed time of the clock, the MV61 will have operated, as explained, under free-running operation. Upon application of the late data signal, the MV63 will be turned on and, since the outputs of MV61 and MV63 are combined at the OR device 81, an output of greater than six microseconds will result. Upon termination of this time interval, MV62 will be turned on.

The operation of the clock, with respect to an early data signal, is as follows. The negative data signal, when applied to line 60, causes the AND device 20′ to issue a positive signal on line 95 and a negative signal on line 96. The positive signal on the line 95 is applied to the emitter follower 41 to initiate charging of the capacitor 51 in the MV63. Line 97, at the beginning of this time interval, produces a negative shift that passes through the OR device 31, line 98, to the negative OR device 81. At the same time, line 84, which is connected to line 98, applied this negative signal to the AND device 20′ to prevent MV62 from being turned on during the ensuing 6-microsecond interval. During this interval, a 6-microsecond negative-going signal is applied through the OR device 81 to the output line 83. Also, during this same time interval, line 99, connected to the top output of the OR device 31, is positive and this positive signal level passes through a delay device, generally referenced 102, and emerges therefrom as a negative signal that is applied to the line 73. The delay device 102 is constituted of level setter 10 connected by way of line 100 to emitter follower 41 in turn connected by way of line 101 to level setter 1. This delay device 102 enables the MV62 to operate before the MV61 during the operation following the turning off of the MV63. Upon the termination of this 6-microsecond time interval, the AND device 20 becomes operative to turn on the MV62 which will establish a new nominal fixed time that is advanced with respect to the previous nominal fixed time of the clock.

When the data signal is late, with respect to the nominal fixed time, the MV61 is turned on in the manner described under free-running operations to provide a 6-microsecond gate signal by way of lines 79, 80 and 83. Shortly thereafter, in response to the applied data signal, the MV63 is turned on in the manner described to provide a 6-microsecond signal on output line 98. These two output signals mix to provide a resultant signal which is greater than six microseconds by an amount of time the data signal is late. Following the turning off of the MV63, the MV62 is turned on to begin a new timed output that is phased with the last applied late data signal.

In FIG. 6, the output on the line referenced Output L83 shows a space interval which is less than six microseconds due to the early data signal. This same output line 83 shows a signal duration of greater than six microseconds which is due to the late data signal. Time $t^1$ indicates a new phased output which is due to an early data signal whereas time $t^3$ shows another phased output that is a result of the late data signal.

While there have been shown and described and pointed out the fundamental novel feature of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A pulse generator for issuing phased output signals in response to applied data signals which may vary with respect to the nominal time of said generator as determined by the free-running periods thereof while under control of a clock run gate signal comprising: first, second and third monostable multivibrators, each provided with associated input and out means, and each adapted to issue a disabling output when on and an enabling output when off; connecting means including first and second coincidence switching means for interconnecting said first and second multivibrators in a mutually alternating and free-running relationship; said first coincidence switching means responsive to a coincidence of enabling output signals from the second and third multivibrators and the clock run gate signal to switch on the first multivibrator to initiate the free-running period of said first and second multivibrators; said second coincidence switching means responsive to a coincidence of enabling output signals from the first and third multivibrators to control the second multivibrator during the free running period of said first and second multivibrators; input means responsive to the applied data signal to switch on the third multivibrator either early or late with respect to the nominal time of said free-running period, depending upon the time of arrival of said data signals, to cause said third multivibrator to issue a correspondingly timed phased output signal and a disabling output signal to the first and second switching means, thereby preventing operations of the second multivibrator in the event the data signal is late or preventing operations of said first and second multivibrators in the event the data signal is early to thereby alter the free-running period; and means interposed between the output of the third multivibrator and the first switching means to prevent switching the first multivibrator before the second upon the switching off of the third multivibrator.

2. A pulse generator for issuing phased output signals in response to applied data signals which may vary with respect to the nominal time of said generator as determined by the free-running periods thereof while under control of a clock run gate signal comprising: first, second and third monostable multivibrators, each provided with associated input and output means, and each adapted to issue a disabling output when on and an enabling output when off; connecting means including first and second coincidence switching means for interconnecting said first and second multivibrators in a mutually alternating and free-running relationship; said first coincidence switching means responsive to a coincidence of enabling output signals from the second and third multivibrators and the clock run gate signal to switch on the first multivibrator to initiate the free-running period of said first and second multivibrators to provide the pulse output for said period; said second coincidence switching means responsive to a coincidence of enabling output signals from the first and third multivibrators to control the second multivibrator to provide the space interval for said period; input means responsive to the applied data signal to switch on the third multivibrator either early or late with respect to the nominal time of said period, depending upon the time of arrival of said data signals, to cause said third multivibrator to issue a correspondingly timed phased output signal and a disabling output signal to the first and second switching means, thereby preventing operations of the second multivibrator in the event the data signal is late or preventing operations of said first and second multivibrators in the event the data signal is early to thereby alter the free-running period; and delay means interposed between the output of the third multivibrator and the first switching means to prevent switching the first multivibrator before the second upon the switching off of the third multivibrator.

3. A pulse generator for issuing phased output signals in response to applied data signals which may vary with respect to the nominal time of said generator as determined by the free-running periods thereof while under control of a clock run gate signal comprising: first, second and third transistorized monostable multivibrators, each provided with associated input and output means, and each adapted to issue a negative output when on and a positive output when off; connecting means including first and second coincidence switching means for interconnecting said first and second multivibrators in a mutually alternating and free-running relationship; said first coincidence switching means responsive to a coincidence of positive output signals from the second and third multivibrators and the clock run gate signal to switch on the first multivibrator to initiate the free-running period of said first and second multivibrators to provide the pulse output for said period; the second coincidence switching means responsive to a coincidence of positive output signals from the first and third multivibrators to switch on the second multivibrator to provode the space interval for said period; input switching means responsive to the applied data signal to switch on the third multivibrator either early or late with respect to the nominal time of said period, depending upon the time of arrival of said data signals, to issue a correspondingly timed phased output signal and negative output signals to the first and second switching means, thereby preventing operations of the second multivibrator in the event the data signal is late or preventing operations of said first and second multivibrators in the event the data signal is early to thereby alter the free-running period; and delay means interposed between the output of the third multivibrator and the first switching means to prevent switching the first multivibrator before the second upon the switching off of the third multivibrator.

4. The combination with a free-running pulse generating clock having first and second transistorized monostable multivibrators, first and second transistorized coincidence switching means, and means interconnecting the multivibrators and switching means to enable alternate operations of the multivibrators; of a third transistorized monostable multivibrator, means connecting the output of the third multivibrator to each of the switching means to further condition the latter according to the output status of the third multivibrator; input means for switching on said third multivibrator in response to applied data signals to cause said third multivibrator to issue output signals phased with the applied data signals, and status signals for disabling the switching means; transistorized delay means interposed in the connecting means between the output of said third multivibrator and the switching means associated with the first multivibrator to prevent operations of the first multivibrator upon the switching off of said third multivibrator; and transistorized output means for combining the free-running pulses with the output pulses from the third multivibrator to provide phased output clock pulses.

References Cited in the file of this patent

UNITED STATES PATENTS

| | | |
|---|---|---|
| 2,724,780 | Harris | Nov. 22, 1955 |
| 2,766,379 | Pugsley | Oct. 9, 1956 |
| 2,807,716 | Steele | Sept. 24, 1957 |
| 2,848,532 | Weida | Aug. 19, 1958 |
| 2,894,215 | Toy | July 7, 1959 |